Sept. 28, 1943.   A. H. EDMONDS ET AL   2,330,566
PATTERN CONTROLLED MACHINE
Filed April 14, 1941     5 Sheets-Sheet 2

Inventors
ALBERT H. EDMONDS
HARRY M. NOBLE

Attorney

Sept. 28, 1943.   A. H. EDMONDS ET AL   2,330,566
PATTERN CONTROLLED MACHINE
Filed April 14, 1941   5 Sheets-Sheet 3

FIG. 4.

Inventors
ALBERT H. EDMONDS
HARRY M. NOBLE
By W. J. McHowell
Attorney

Sept. 28, 1943.    A. H. EDMONDS ET AL    2,330,566
PATTERN CONTROLLED MACHINE
Filed April 14, 1941    5 Sheets-Sheet 4

Inventors
ALBERT H. EDMONDS
HARRY M. NOBLE

Attorney

Sept. 28, 1943. A. H. EDMONDS ET AL 2,330,566
PATTERN CONTROLLED MACHINE
Filed April 14, 1941 5 Sheets-Sheet 5

Inventor
ALBERT H. EDMONDS
HARRY M. NOBLE

By W. S. McDowell
Attorney

Patented Sept. 28, 1943

2,330,566

UNITED STATES PATENT OFFICE 2,330,566

PATTERN CONTROLLED MACHINE

Albert H. Edmonds and Harry M. Noble,
Lancaster, Ohio

Application April 14, 1941, Serial No. 388,538

4 Claims. (Cl. 90—13.4)

This invention relates to metal working machine tools, having particular reference to machine tools of the multiple spindle type adapted for duplicating operations.

It is an object of the present invention to provide a machine tool wherein one or more work blanks is machined or cut in accordance with surface configuration appearing on a pattern or master blank, whereby to automatically produce in or on corresponding surfaces of the work blank or blanks the designs, configurations or embellishments present in or on the surfaces of the master blank.

The machine tool forming the present invention finds useful application in the manufacture of metallic bodies employed as molds in the production of cast articles of glassware. Such molds usually have their glass-engaging surfaces cut to provide ornamental designs of many different types, so that the glassware, cast or formed in the molds, will bear surface embellishments corresponding to the designs borne on the molds. Hitherto, these molds, insofar as their pattern bearing surfaces are concerned, have been cut by manual methods, employing skilled workers to produce the intricate designs appearing thereon, conditions which render the molds slow and costly to manufacture.

In accordance with the present invention, therefore, there is provided a machine which, when set up for operation, will enable designs or surface patterns contained on a master mold to be duplicated through automatic machine operation on the corresponding surfaces of one or more blank molds, thereby expediting the manufacture of such molds, minimizing manual operations thereon and reducing production costs.

For a further understanding of the invention, reference is to be had to the following description and the accompanying drawings, wherein.

Figure 1:
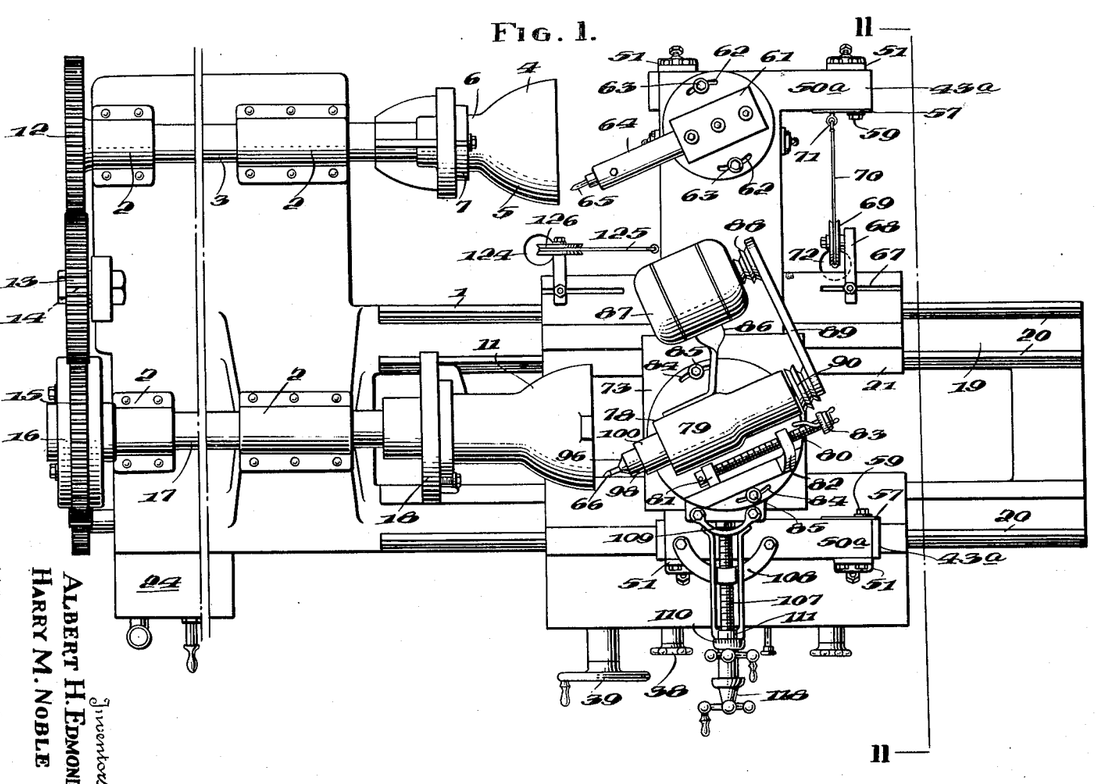
Fig. 1 is a plan view of a machine tool formed in accordance with the present invention.

Referring to the drawings, the numeral 1 designates the stationary bed construction of the machine tool in which the present invention is embodied, said bed construction being similar to that employed in lathe design. The left side of the bed, as viewed in Fig. 1, is comparatively wide and has mounted thereon bearing blocks 2. Rotatably mounted in one of these longitudinally aligned sets of blocks is a drive shaft 3, which is adapted to be driven at a desired rate of speed by means of any standard machine tool driving mechanism, not shown. Adapted to be detachably mounted on one end of the drive shaft 3 is a master mold 4, this mold being of the usual type employed in the production of cast articles of glassware.

As shown, the mold comprises a hollow semi-spherical body 5, a neck 6 and a circular base 7. The mold is preferably formed from a cast steel body and, in addition to the exterior configuration described, is machined to include an enlarged circular chamber 8 within the body 5, the walls of the chamber being arcuate in cross section, as disclosed in Fig. 4, the inner end of the chamber 8 communicating with a bore 9, formed in the neck portion 6. By referring to Fig. 4, it will be noted that the arcuate wall of the chamber 8 has cut or otherwise produced therein an ornamental design or pattern of, for example, the type indicated at 10. It is the purpose of the present invention to provide means for duplicating or reproducing the design 10 in an automatic manner upon the corresponding surfaces of one or more blank molds of the type shown at 11.

The end of the shaft 3 opposed to that end which receives the mold 4, has fixed thereto a gear 12, the latter meshing with an idler gear 13, rotatably mounted on a fixed stud shaft 14, projecting from the frame of the bed 1. The idler gear 13 meshes with a gear ring 15 which is adapted to be frictionally and adjustably clamped in driving engagement with a pair of disks 16 keyed or otherwise connected for rotation with one end of a blank mold spindle 17. This spindle is rotatably supported in a second longitudinally aligned set of the bearing blocks 2, the spindle 17 being disposed in parallel relationship with the drive shaft 3. The end of the spindle 17, opposed to the gear 15, carries a work clamping head 18 to which is detachably secured the base of the blank mold, shown at 11. It will be understood at this juncture that while the machine illustrated has, for purposes of simplicity, but one spindle or shaft for the reception of a blank mold, any desired number of spindles may be employed, so that the pattern 10 appearing on the master mold 4 may be simultaneously reproduced on one or more of the blank molds. The molds 4 and 11 are carried on the ends of their respective shafts to rotate in unison with said shafts about their longitudinal axes.

Figure 2:
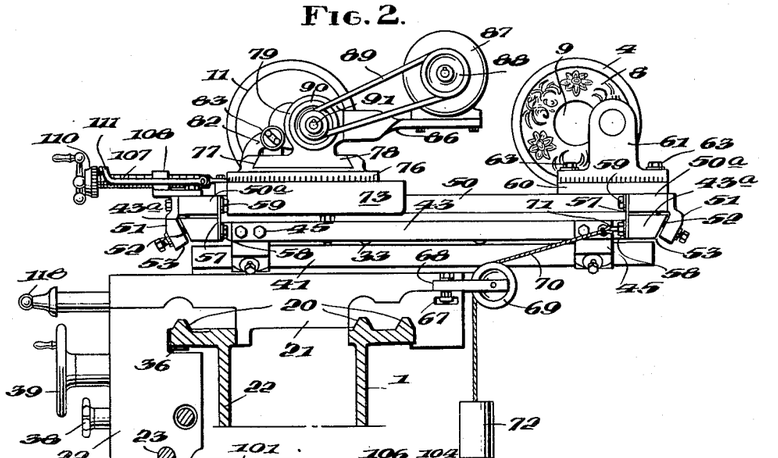
Fig. 2 is a vertical transverse sectional view taken through the machine tool on the plane disclosed by the line II—II of Fig. 1.

As illustrated in Figs. 1 and 2, the bed construction 1 is formed with a longitudinally disposed horizontal extension 19. The upper surfaces of this extension are provided with parallel, longitudinally extending guide ribs 20. Mounted for longitudinal travel on the upper surfaces of the extension 19, and guided by the ribs 20, is a carriage 21. Longitudinal traverse of the carriage on the extension 19 may be effected by any suitable means such as the gearing generally employed for the same purpose in lathes and diagrammatically illustrated in Figs. 9 and 10.

This gearing is arranged in a housing 22 formed with the front of the carriage and known in the trade as the "apron" of the machine. Power is introduced to the gearing in the apron through a shaft 23 extending longitudinally of the bed 1 and rotated through a train of gears located between the shaft and the gear ring 15 or other suitable gearing carried by one of the spindles 3 and 17. Variations in speed of rotation of said shaft may be secured through the provision of a change speed transmission enclosed by a cover 24 at the left end of the bed as viewed in Fig. 1.

Figures 9, 10:
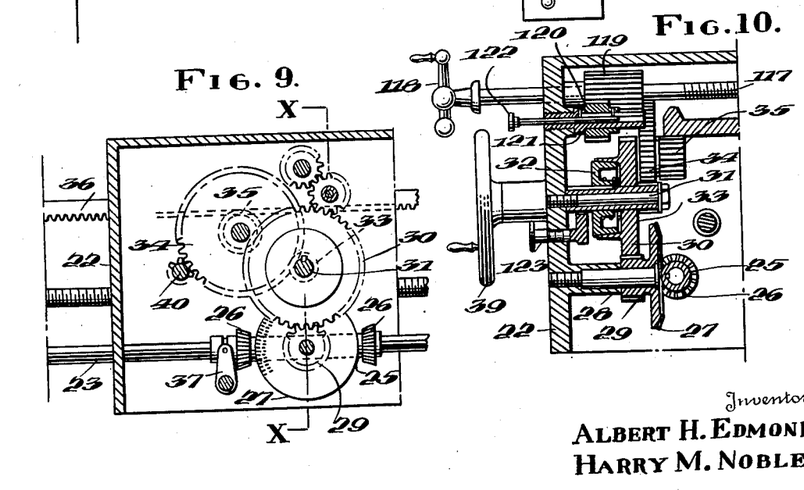
Fig. 9 is a detail sectional view taken through the apron of the machine and showing the means for effecting automatic movement of the carriage on the bed.
Fig. 10 is a vertical transverse sectional view taken on the plane indicated by the line X—X of Fig. 9.

As illustrated in Figs. 9 and 10, the shaft 23 has a sleeve 25 splined thereon for sliding movement longitudinally of the shaft and rotation in unison therewith. This sleeve includes oppositely disposed bevel pinions 26 which are selectively engaged with a bevel gear 27 journaled within the apron, as at 28. The gear 27 has a small pinion 29 formed therewith, the teeth of which are in meshing engagement with the teeth of a large gear 30 supported for rotation within the apron on a stud 31. A cone clutch 32 is provided to establish a driving connection between the gear 30 and a pinion 33 also rotatable about the axis of the stud 31. Another large gear 34 meshes with the pinion 33 and transmits motion from this member to another pinion 35 disposed in meshing relation with a series of rack teeth 36 depending from the under side of a flange formed on the bed of the machine.

It will be seen, at this point, that when one of the bevel pinions 26 is engaged with the teeth of the bevel gear 27, rotation of the shaft 23 will be transmitted through the gears 29, 30, clutch 32, pinion 33 and gear 34 to pinion 35. As the latter pinion revolves, the carriage will be moved longitudinally of the bed. The direction of movement can be changed by moving the sleeve 25 longitudinally of the shaft 23 to disengage the first bevel pinion 26 from the gear 27 and engage the other pinion 26 therewith. Movement of the sleeve is effected through the operation of a shifting fork 37 controlled from in front of the apron by a hand knob 38.

In the event it is desired to move the carriage manually, the sleeve 25 may be adjusted to a neutral position wherein neither gear 26 is engaged with the gear 27. A hand wheel 39 may then be rotated to impart rotary movement to the gear 34 through a pinion 40 which is fixed to the shaft of the hand wheel. The manual movement of the carriage is desirable when a compound tool rest, about to be described, is being set to reproduce a design in a mold.

Figure 3:
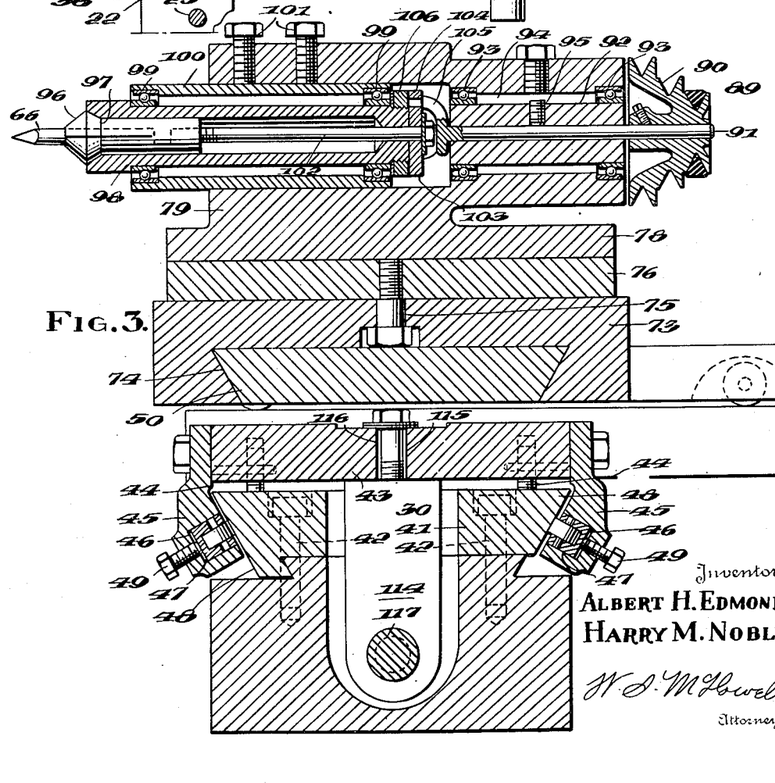
Fig. 3 is a vertical sectional view taken through the blank mold cutting tool and its supporting and driving mechanism.

The compound tool rest is supported entirely by the carriage and moves therewith when the latter is automatically or manually moved. This rest, as shown in Figs. 1, 2 and 3, comprises a bottom plate 41, extending transversely of the machine, said plate being stationarily secured by means of screws 42 to the carriage body. Above the plate 41, the tool rest is provided with an intermediate plate 43, the latter being horizontally disposed and mounted for transverse or crosswise movement with respect to the bed of the machine. At spaced intervals, the plate 43 is formed with pockets for the reception of rollers 44, the latter engaging with the flat, horizontally disposed, upper surfaces of the bottom plate 41. The intermediate plate is guided in its movements relative to the bottom plate by the provision of brackets 45 which are carried by the longitudinal edge walls of the plate 43 in depending order. The lower portions of the brackets 45 are recessed for the reception of roller frames 46, the said frames carrying rollers 47, whose peripheries engage with the downwardly beveled sides 48 of the bottom plate 41. Set screws 49, carried by the brackets 45, are used to engage the roller frames 46 so as to positively advance said rollers into engagement with the beveled sides 48 of the bottom plate and eliminate any looseness or lost motion which might interfere with the accurate reproduction of designs.

Arranged above the intermediate plate is a flat horizontally disposed top plate 50, the latter being mounted on the plate 43 so that it will be permitted to move longitudinally with respect to the bed of the lathe and transversely with respect to the intermediate plate. To provide for this movement with the use of antifriction means, the opposite ends of the top plate 50, as shown in Fig. 2, are provided with depending brackets 51, similar in construction and function to the brackets 45. The brackets 51 carry rollers 52 which engage with the downwardly beveled sides 53 of laterally directed extensions 43a integrally formed with the ends of the plate 43. The rollers 52 are maintained in engagement with the sides 53 by the use of set screws corresponding to those disclosed at 49. Also, the ends of the top plate 50 are formed with pockets 55 in which are positioned vertically disposed rollers 56, which rotate about horizontal axes. The rollers 56 engage with the flat upper surfaces of the intermediate plate 43 so that an antifriction means is thus provided for permitting the top plate to move relative to the intermediate plate.

Preferably, the rollers 44, 47, 52 and 56 are of the ball bearing type in order to eliminate as much friction as possible and permit the intermediate and top plates, 43 and 50 respectively, to move in response to slight forces as if they were floating.

To increase the stability, as well as the distance the top plate might travel with respect to the intermediate plate, both are formed at their ends with the lateral extensions 50a and 43a, respectively, which project from the plates on the sides opposite the molds. The inner sides of the extensions 43a are provided with clamp plates 57, the upper portions of which project to positions adjacent to the sides of the extensions 50a. Screws 58 rigidly secure the plates 57 to the extensions 43a and additional screws 59 extend through slots in the plates and into the extensions on the top plate. When the screws 59 are tightened, the plates 57 will be clamped to the extensions 50a and the top plate will then be restrained against movement relative to the intermediate plate and both will be permitted to move in unison on the lower plate. If the screws 59 are loosened to release the clamp plates from the extensions 50a, the top plate will then be free to move on the intermediate plate during certain operations to be hereinafter described.

Disposed on the top plate 50 at one end thereof is a circular pad 60. Mounted on this pad for turning movement about a fixed vertical axis is a stylus support 61. The bottom of this support is formed with arcuate slots 62 which receive threaded fastening devices 63, employed for maintaining the support 61 in fixed positions of adjustment. The upper portion of the support 61 is formed with a longitudinally extending bore adapted for the reception of a cylindrical bar 64, the outer end of the bar being tapered and reduced in size to provide a sharp pointed stylus or tracer 65. The element 65 may be formed as an integral part of the bar 64 or as a separate removable body.

In the use of the tool to produce designs in mold bodies, the top and intermediate plates are clamped together as above described and the support 61 is adjusted so that the stylus element will have its pointed end engaged with the surface of the chamber 8 provided in the master mold 4. By being so positioned, the stylus or tracer will contact the design or pattern 10, closely following the ridges and indentations of said design or pattern as the mold 4 revolves in unison with the shaft 3 and as the carriage is fed longitudinally on the bed 1. The contact of the pointed end of the stylus with these ridges and indentations imparts corresponding movement to the intermediate and top plates 43 and 50, and this movement, in turn, is correspondingly imparted to a cutting tool (or tools) 66 maintained in engagement with the blank mold or molds 11, thereby cutting patterns or designs in the blank mold or molds exactly corresponding with those of the master mold.

To maintain the stylus 65 in positive yet yielding engagement with the design-bearing surfaces of the master mold, the carriage 21 is slotted as at 67 for the reception of an adjustable arm 68. The outer end of this arm carries a sheave 69 over which is trained a cable 70. The upper end of this cable is connected as at 71 with the extension 43a of the intermediate plate 43, and the lower end of the cable is joined with a weight 72. The tendency of the weight 72, therefore, is to move the intermediate plate crosswise of the carriage, maintaining the stylus point in contact with the master mold and the cutting tool in firm engagement with the surface of the blank mold to be ornamented.

To effect the support of the cutting tool 66 for the blank mold, the top plate 50 slidably carries a base plate 73. The under side of this base plate is formed with a dovetail groove 74 which receives the top plate 50, shown in Fig. 3. Rotatably positioned for movement about a stud 75, disposed in the vertical axis of the plate 73, is a circular pad 76. The top of this pad is formed with a dovetail recess 77 for the reception of a correspondingly shaped base extension 78 of a tool head 79. This head is adjustable longitudinally of the recess 77 by the provision of a screw 80. One end of this screw is journaled in a lug 81 projecting from the head 79, while the shank of the screw is received within the threaded aperture of an ear 82 rising from the pad 76. The outer end of the screw 80 is provided with a calibrated manipulating knob 83. The working positions of the tool rest or head 79 are thus rendered adjustable through the rotation of the screw 80, which moves the tool head longitudinally of the pad recess 77, and also further adjustment is provided by rotating the pad and the head 79 about the axis provided through the use of the stud 75. This latter adjustment may be maintained by providing the pad 76 with arcuate slots 84 which receive threaded binding devices 85 carried in connection with the base plate 73.

Rigidly projecting from the head 79 is a stationary bracket 86, upon the outer portion of which is mounted an electric motor 87. The shaft of this motor carries a stepped sheave 88, over one section of which is trained an endless drive belt 89, said belt being also trained over a second stepped sheave wheel 90. This latter wheel is secured to the outer end of a shaft 91, journaled longitudinally in the tool head 79. The shaft 91 is positioned in the bore of a sleeve 92 and, as shown in Fig. 3, this sleeve is supported at both ends by means of antifriction bearings 93, said sleeve and shaft being disposed within a longitudinally extending bore 94, formed in the head 79. A set screw 95 is used to cause the sleeve 92 to rotate in unison with the shaft 91.

The cutting tool 66 is clamped between the separable jaws of a chuck 96. Said chuck includes a cylindrical shank extension 97 which is received within the bore of a sleeve 98, the latter being supported at both ends with antifriction bearings 99, the outer rings of the bearings 99 being mounted in connection with a sleeve 100 which concentrically surrounds the inner sleeve 98. The sleeve 100, and the cutting tool assembly, is stationarily held in the bore 94 of the head 79 by means of set screws disclosed at 101.

Connected with the shank 97 of the chuck 96 is one end of a rod 102. The other end of the rod 102 projects through the sleeve 98 and through an axial opening provided in a disk 103. Toward its outer circumference, the disk 103 is formed with openings 104, which receive the ends of curved fingers 105, carried by the inner end of the shaft 91. This construction is such that the cutting tool assembly, comprising the chuck 96, the inner sleeve 98, the outer sleeve 100 and the disk 103, may be bodily removed from the bore 94 of the tool head upon the loosening of the set screws 101, providing for the ready removal and convenient insertion of different cutting tool assemblies. It will be seen that when the assembly is moved to its operative position in the bore 94, the openings 104 in the disk 103 are registered with the fingers 105 of the shaft 91, so that a drive coupling is readily obtained. The inner end of the sleeve 98 is threaded for the reception of a nut 106, in order to maintain proper relationship between the inner rotatable sleeve 98, the anti-friction bearings 99 and the outer sleeve 100.

In addition to the rotatable adjustment of the tool head 79 about the axis of the stud 75, and the adjustments provided by the screw 80, a further adjustment is provided by sliding the base plate 73 on the plate 50. This is accomplished by the use of the screw indicated at 107. The threaded shank of the screw 107 is received within a correspondingly threaded opening provided in a bracket 108 carried by the top plate 50, and the inner end of said screw 107 is swiveled as at 109 in connection with the base plate 73. The outer end of the screw 107 carries a calibrated knob 110, by means of which the screw may be rotated and the extent of rotation determined by comparison of the calibrated surface of the knob with an index frame 111, which also projects horizontally and forwardly from the base plate 73.

Figure 4:
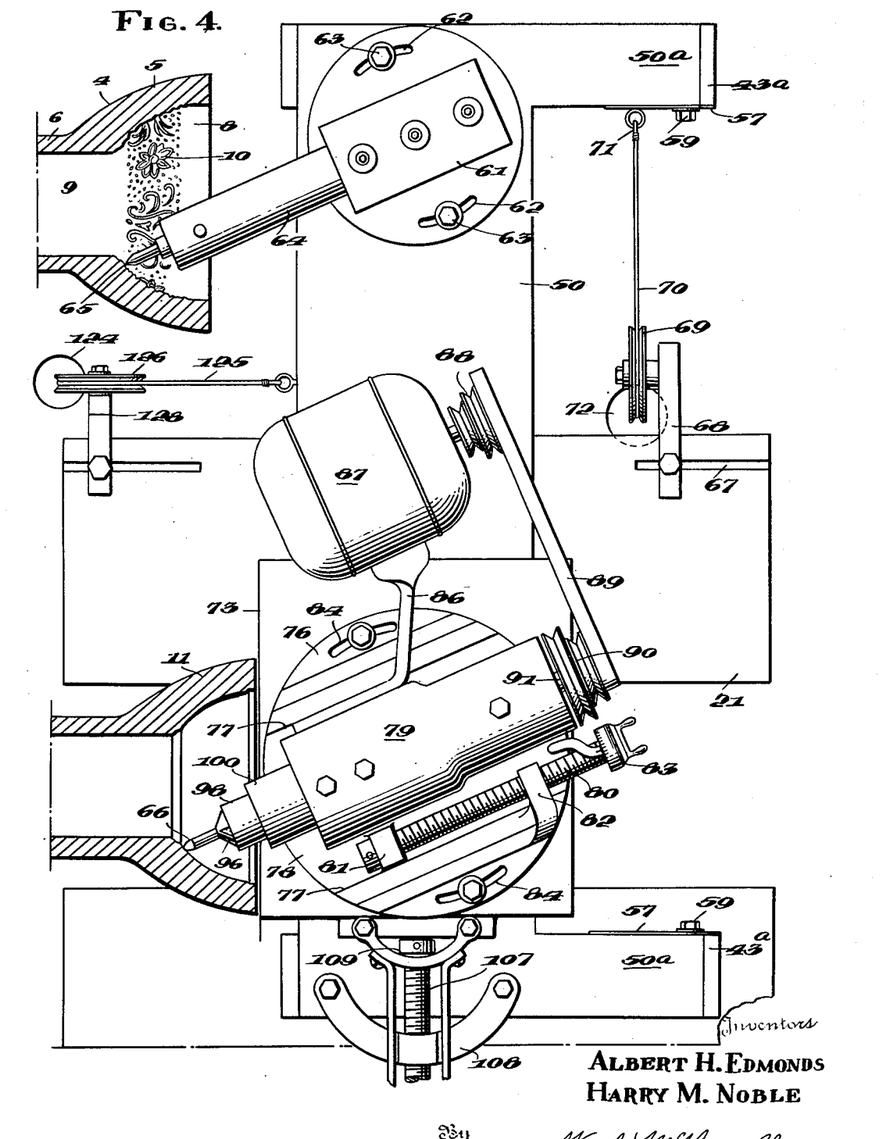
Fig. 4 is an enlarged plan view of the tracing and cutting tools and the supporting mechanism therefor, the master and blank molds being shown in horizontal section.

It will be seen that when the apparatus is arranged as disclosed in Fig. 4, the movable support for the stylus 65 and the cutting tool 66 will cause the latter to provide in a blank mold the design pattern appearing as at 10 on the master mold. This is accomplished automatically and without the necessity of manual operations after the stylus and cutting tools have been properly adjusted, as in Fig. 4, in relation to the corresponding surfaces of the master and blank molds.

During the cutting operation, the cutting tool 66 is rapidly rotated and held against the moving surface of the blank mold. Due to the relative movement of the various parts and the direction of rotation, the tool rapidly cuts tiny pieces from the blank mold until the pattern appearing in the master mold has been completely reproduced. The faithfulness of the reproduction depends upon the shape of the cutting tool, the manner of contact with the mold surface and the relative speeds of rotation of the mold and cutting tool. More accurate reproductions and smoother surfaces in the designs can be produced when the tool is rotated at high speed. In many instances, after being so ornamented, the molds can be used in the production of glass articles without requiring any additional work such as chipping or polishing, to be performed thereon.

Figure 5:
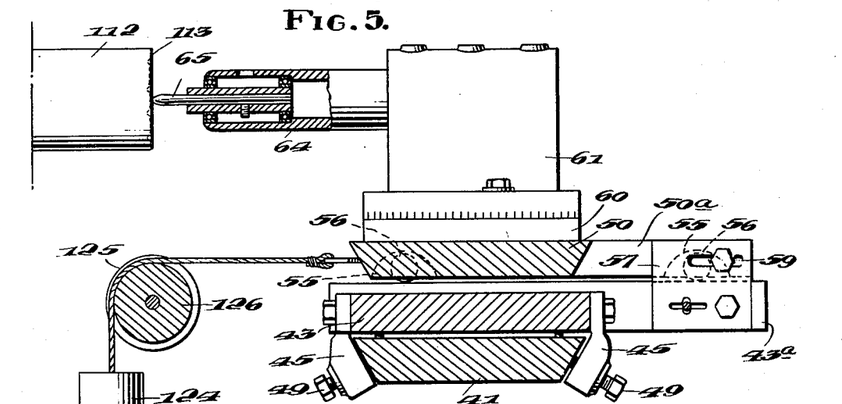
Fig. 5 is a vertical transverse sectional view disclosing the tracing tool and its supporting mechanism, the tracing tool being shown in a position to operate on the end wall of a cylindrical body.

In the operation depicted in Fig. 5, the stylus or tracing tool 65 is positioned to engage the design-bearing surface of a mold valve 112. In glass article forming molds, of the type illustrated at 4 and 11, the necks 6 thereof receive a cylindrical body or plug, known in the art as a valve. This member is inserted in the neck portion 6 when the mold is in use and, quite often, the flat end surface 113 of such a valve is provided with an ornamental pattern. With the use of the machine comprising the present invention, the valve pattern may be readily duplicated on valve blanks.

It will be noted that when the machine is employed to ornament the relatively flat end surfaces of the valves 112, the screws 59 are loosened to permit relative movement between the intermediate and top plates, the latter being free to move longitudinally with respect to the bed 1 of the machine in order to permit the tracer to enter the depressions of the design on the valve. During the valve ornamenting operation, it is necessary to move the stylus and the cutting tool transversely across the face of the valve. To secure this motion, the intermediate plate 43 is rigidly clamped to a block 114 by a screw 115 which passes through a slot 116 extending longitudinally of the plate 43. The block 114 is disposed in registering openings in the lower plate 41 and the carriage and at its lower end is provided with a threaded opening for the reception of a screw 117 journaled for rotation in the carriage. The forward end of the screw 117 passes through the apron and is equipped with a hand crank 118 through the operation of which the screw can be manually rotated to move the intermediate and top plates and the mechanism carried thereby transversely of the machine when the latter is being set to cut designs in the valves. After the machine has been set with the stylus and cutter in proper relation to the master and blank valves, the top and intermediate plates and complemental mechanism is automatically moved transversely of the bed through gearing illustrated more particularly in Figs. 9 and 10.

This gearing includes a long gear 119 which is fixed to the screw 117 and meshes with a pinion 120 adjustably supported within the apron as at 121. A knob 122 is arranged exteriorly of the apron to effect the adjustment of the pinion 120 from the position shown in Fig. 10 to a driving position wherein power will be transmitted from the shaft 23 through the gears 26, 27, 29, 30, 120 and 119 to the screw 117. Rotation of the screw 117 causes the block 114 to move longitudinally thereof and since the intermediate plate is secured thereto, it will also be moved. Longitudinal movement of the carriage, at this time, is precluded by releasing the clutch 32 through the manipulation of a knob 123 at the front of the apron. The release of the clutch converts the gear 30 into an idler and interrupts the driving connection between this gear and the pinion 33.

While the tool and stylus are moving across the face of the valve members, they are maintained in yieldable contact therewith through the action of a weight 124 connected to one end of a cable 125, the other end of which is connected to the top plate 50. The intermediate portion of the cable passes around a sheave 126 journaled on a bracket 128 which is secured to the carriage. By reason of the rollers between the intermediate and top plate and the weight cable and sheave, the stylus will be permitted to follow the surface contours closely and the tool caused to faithfully reproduce the design.

Figure 6:
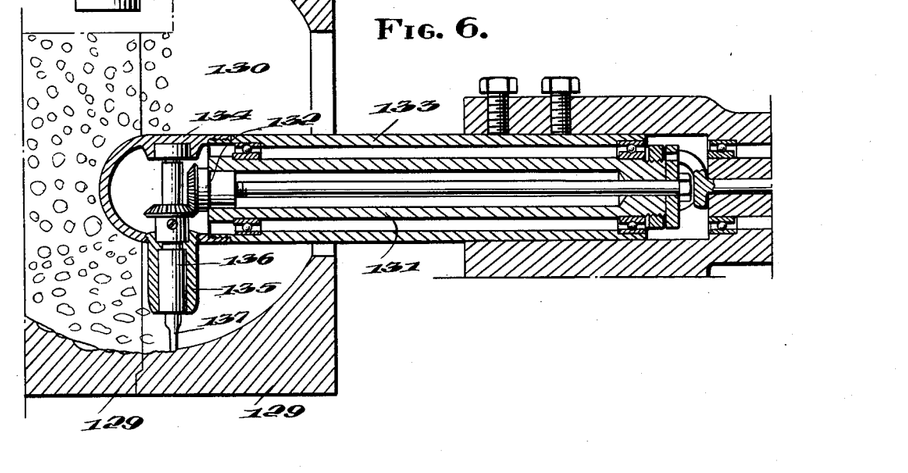
Fig. 6 is a vertical longitudinal sectional view taken through a modified form of the cutting tool mechanism, showing the tool engaged in an operation where extreme angularity of the tool with respect to its supporting mechanism is necessitated.
Figure 7:
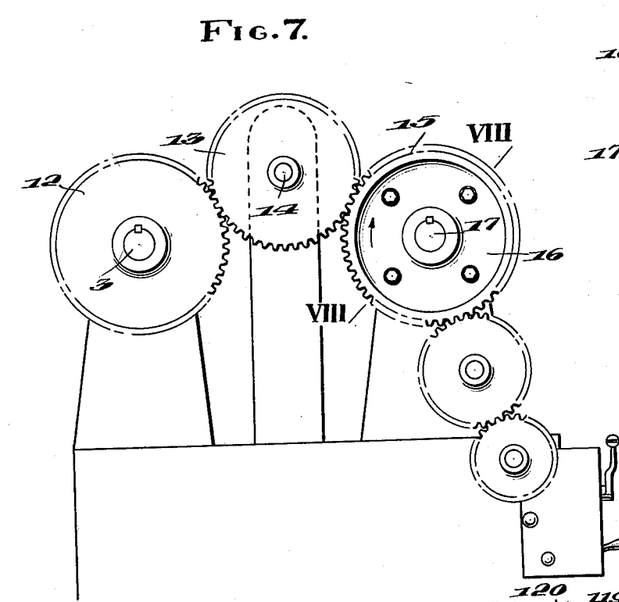
Fig. 7 is an end view of the machine showing the gears which provide for the rotation of duplicate spindles at the same speed and in the same direction.

Some glass molds possess the configuration disclosed in Fig. 6 of the drawings, involving two separable sections as indicated at 129, which sections jointly provide a globular internal chamber 130, the surfaces of such a chamber being cut to provide various designs. In order to render either the stylus or cutting tools adaptable to molds of this type, the inner sleeve 131 of the cutting tool assembly carries a bevel gear 132. The outer sleeve 133 receives a threaded cap 134, the latter carrying a tubular laterally disposed extension 135 in which is journaled a chuck 136, the latter carrying a cutting tool 137. The inner end of the chuck is equipped with a bevel gear 138, which meshes with the gear 132. Otherwise, the construction is the same as that disclosed in Fig. 3. With the form of the cutting head illustrated in Fig. 6, the cutting tool carried thereby may assume extreme angular positions and reach inaccessible portions of a mold of which the more simplified construction disclosed in Fig. 3 is incapable. If it becomes necessary to hold the tool at different angles than that of which the device in Fig. 6 is capable, other assemblies may be provided having gears beveled at different angles.

Figure 8:
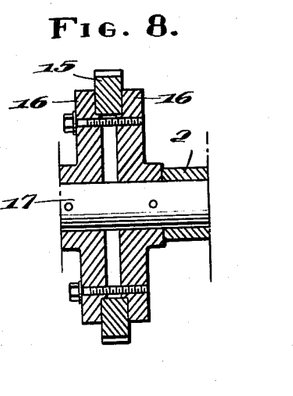
Fig. 8 is a detail sectional view taken on the plane indicated by the line VIII—VIII of Fig. 7.

Through the provision of the adjustable ring gear illustrated in Fig. 8, it is possible to use a master mold having a design cut only in a fractional part thereof. After the blank has been cut, the ring gear may be released to permit the mold to be rotated manually to register a fresh uncut section with the design bearing section of the master and cutting operation repeated. These adjusting and cutting operations may be repeated until the entire mold has been ornamented. Such a method, of course, requires more time and would only be used when the design was very difficult to produce on the master mold.

By the use of the present invention, it is possible to readily duplicate the intricate patterns or complex design embellishments appearing on a given or master mold, avoiding particularly the large amount of hand work which has hitherto been occasioned in the production of metallic molds used in producing glass articles. The apparatus is readily adaptable to the peculiar shapes of such molds and the stylus and cutting tools are readily adjustable to assume desired operating positions. As stated, one or more cutting tools may be mounted on the relatively slidable tool rests provided by the plates 43 and 50.

To eliminate undue wear on the outer end of the stylus 65 and consequent inaccuracies resulting therefrom, it may be found desirable to secure the member 65 in a sleeve which is journaled in antifriction bearings positioned in the bar 64. This mounting will permit the stylus to rotate as the master mold moves past the end and reduce the friction developed. It will also increase the period of usefulness of the stylus. When it becomes necessary to remove the stylus for grinding or replacement, the screw which clamps it in the sleeve may be loosened and the member pulled out of the forward end of the sleeve.

While the upper and intermediate plates of the tool holder have been mounted for movement in directions parallel and at right angles to the axis of rotation of the molds, it is obvious that this direction of movement could readily be changed, and, if desired, the plates could be made to move simultaneously in response to the forces of their respective weights, the direction and extent of movement being dependent upon the shape of the particular mold being operated upon.

Other changes and variations may be made in the construction and relation of the various parts without departing from the spirit and scope of the invention as defined in the following claims.

What is claimed is:

1. In mechanism for duplicating designs in inner surfaces of glass molds, a bed having longitudinal guides, a carriage supported for movement on said guides, means for imparting controlled movement to said carriage, a pair of shafts journaled on said bed for rotation about axes parallel to said guides, means for securing a blank mold to one shaft and a mold bearing the design to be duplicated to the other shaft, tool supporting means mounted on said carriage, said means comprising superposed bottom, intermediate and top plates, the bottom plate being rigidly secured to said carriage, cooperating means on the bottom and intermediate plates providing for guided movement of the intermediate plate on the bottom plate in a path at right angles to said guides, similar means between the upper and intermediate plates providing for guided movement of the upper plate on the intermediate plate in a path parallel to said guides, means for preventing undesired movement between said upper and intermediate plate, a stylus, a cutting tool, means carried by said upper plate for rotatably supporting said stylus and cutting tool in predetermined spaced relationship, said supporting means being adjustable to vary the angles of the axes of rotation of said stylus and cutting tool relative to that of said molds, a cable guide mounted on said carriage, cable means secured at one end to said intermediate plate and trained over said cable guide, and weight means fixed to the opposite end of said cable, said weight serving to move said intermediate and upper plates relative to said carriage whereby said stylus and cutting tool will be maintained in yieldable engagement with said molds.

2. In mechanism for duplicating designs in inner surfaces of glass molds, a bed having longitudinal guides, a carriage supported for movement on said guides, means for imparting controlled movement to said carriage, a pair of shafts journaled on said bed for rotation about axes parallel to said guides, means for securing a blank mold to one shaft and a mold bearing the design to be duplicated to the other shaft, tool supporting means mounted on said carriage, said means comprising superposed bottom, intermediate and top plates, the bottom plate being rigidly secured to said carriage, cooperating means on the bottom and intermediate plates providing for guided movement of the intermediate plate on the bottom plate in a path at right angles to said guides, similar means between the upper and intermediate plates providing for guided movement of the upper plate on the intermediate plate in a path parallel to said guides, cable guide means mounted on said carriage, a pair of cables, one being secured at one end to said intermediate plate and the other secured at one end to said upper plate, said cables being trained over said cable guides, weight means secured to the other ends of said cables, a stylus, a rotary cutting instrument, and means securing said stylus and cutter to said upper plate, said weight means serving to move said intermediate and upper plates to maintain said stylus and cutter in yielding engagement with said design bearing and blank molds, respectively, during rotation thereof.

3. In apparatus for duplicating designs on the interior surfaces of glass molds, a base, means on said base supporting a design bearing master mold and a blank mold for rotation about parallel axes, tool supporting table means disposed adjacent to said molds, said table means comprising top and bottom plates, a master mold-engaging stylus and a blank mold cutting tool carried by said top plate, cooperative means on said base and bottom plates providing for movement of the latter on the former at right angles to the axes of rotation of said molds, similar means on said plates providing for movement of the top plate in parallel relation to the axes of rotation of said molds, power operated means for selectively and positively moving said plates at right angles to the axes of rotation of said molds and parallel thereto, and means for delivering yieldable moving forces to said plates whereby said stylus and cutting tool will move at right angles to the direction in which said plates are being positively moved.

4. In apparatus for duplicating designs on the interior surfaces of glass molds, a base, means on said base supporting a design bearing master mold and a blank mold for rotation about parallel axes, a pencil-like tracer element, a sharp pointed rotary cutter, means for holding said tracer element and cutter in spaced parallel relation adjacent to said master mold and blank mold respectively, means for selectively and positively moving said tracer and cutter in a horizontal plane in paths parallel to and at right angles to the axes of rotation of said molds, and means for imparting yieldable forces to said cutter and tracer holding means whereby it will be impositively moved at right angles to the axes of rotation of said molds when being positively moved in parallel relation thereto and impositively moved in parallel relation to the axes of rotation of the molds when being positively moved at right angles thereto.

ALBERT H. EDMONDS.
HARRY M. NOBLE.